UNITED STATES PATENT OFFICE 2,369,156

PROCESS OF MAKING VITAMIN A

Nicholas A. Milas, Belmont, Mass., assignor to Research Corporation, New York, N. Y., a corporation of New York No Drawing. Application August 22, 1940, Serial No. 353,775

2 Claims. (Cl. 260—617)

The general object of the present invention is to provide a novel process for the synthetic production of vitamin A and a number of related intermediate products.

The accepted chemical structure of vitamin A is represented by the formula:

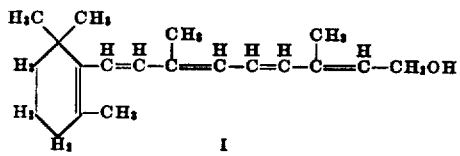

I

It readily may be seen that vitamin A, as well as other antixerophthalmic carotenoids (antixerophthalmic provitamins), are related to β-ionone which is a well known substance used as an important ingredient in the synthesis of perfumes.

The first step in my process consists in the condensation of β-ionone with ethyl chloroacetate (see Equation A) in the presence of solid anhydrous sodium ethylate, using anhydrous toluene or benzene as solvents, thereby producing compound II, Equation A.

*Equation A*

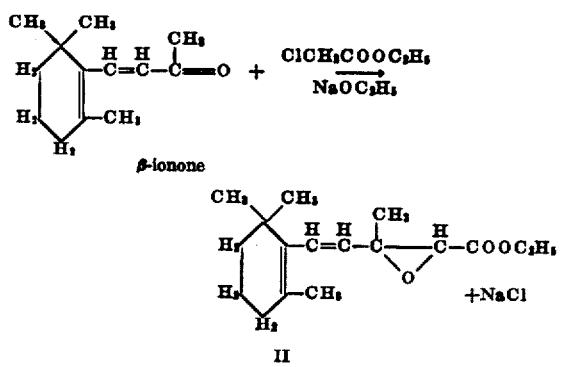

Other alkali alcoholates advantageously may be used in this condensation provided they are free from alcohols.

The reaction of Equation A is understood to involve two reactions which proceed simultaneously or successively, i. e. the combination of the β-ionone and the ethyl chloroacetate forming the compound

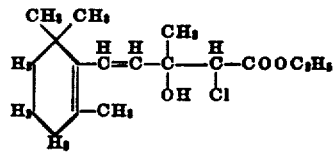

which reacts with the sodium ethylate yielding compound II.

In the second step compound II is saponified with 10% alcoholic potash and the resulting glycidic acid, compound III, Equation B, is separated and decarboxylated by distillation to produce 1-[2',6',6'-trimethyl cyclohexen-1'-yl]-3-methyl buten-1-al-4, compound IV, Equation C.

*Equation B*

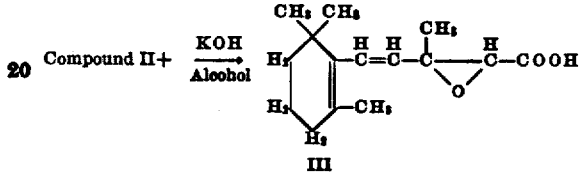

III

*Equation C*

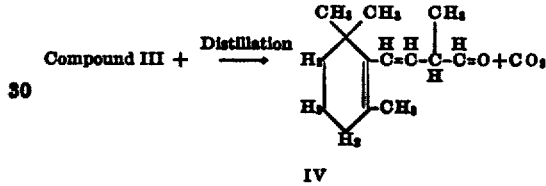

IV

Compound IV may be prepared also by condensing, in an ethereal solution, β-ionone with ethyl dichloroacetate ($Cl_2CHCOOC_2H_5$) in the presence of dilute magnesium amalgam, yielding compound IIa, Equation D, which latter may be saponified with alcoholic potash and the resulting saponification product decarboxylated to product IV as in Equations B and C.

*Equation D*

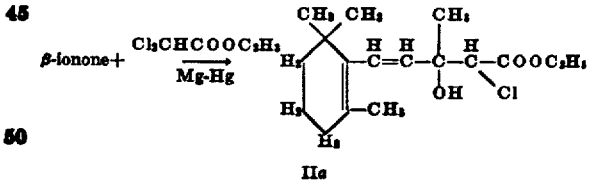

IIa

Here it will be seen that compound IIa is identical with the intermediate product of Equation A and when this product IIa is subjected to saponification with alcoholic KOH as in Equation B it is simultaneously or successively converted into compound II and compound III.

In the third step, compound IV is condensed with sodium or lithium acetylides in a mixture of anhydrous ether and liquid ammonia at temperatures between −55° and −70° C. After the reaction is over, the ammonia is removed and the product treated with a dilute solution of tartaric acid, although aqueous solutions of ammonium sulfate, ammonium chloride or other organic acids may also be used. The resulting compound V, Equation E, is extracted from this mixture in an impure state and may be purified either by high vacuum distillation in an inert atmosphere or by preparing its phthalic acid ester by reacting the mixture with phthalic anhydride in pyridine solution. The phthalic acid ester is subsequently saponified to obtain the pure acetylene carbinol, compound V.

*Equation E*

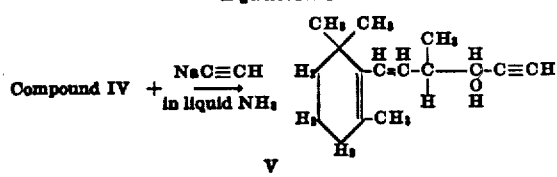

Compound V may be prepared also (see Equation F) by the interaction of the mono-Grignard of acetylene (HC≡CMgX) and the aldehyde compound IV.

*Equation F*

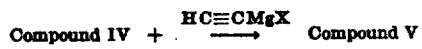

In the fourth step compound V may be dehydrated by distilling under high vacuum with small amounts of naphthalene sulfonic acid or p-toluene sulfonic acid yielding compound VII directly (see Equation G).

*Equation G*

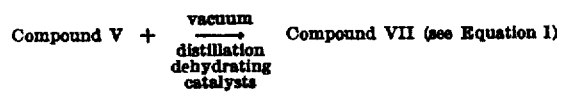

However, better yields of compound VII are obtained by preparing the bromide, compound VI, Equation H, of compound V and subsequently removing hydrogen bromide with alcoholic potash (see Equation I).

*Equation H*

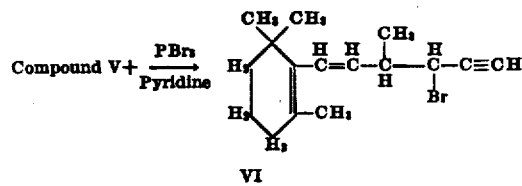

*Equation I*

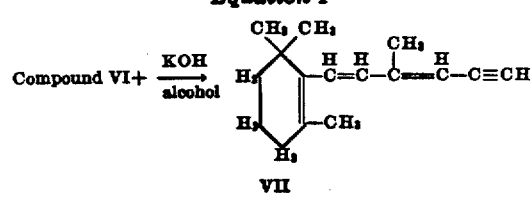

In the fifth step the Grignard or alkali metal acetylide of compound VII is prepared by allowing it to react in ether solution with ethyl magnesium bromide. To the Grignard or alkali metal acetylide of compound VII is slowly added methyl vinyl ketone

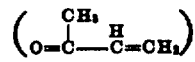

whereby the product VIII is formed (see Equation J).

*Equation J*

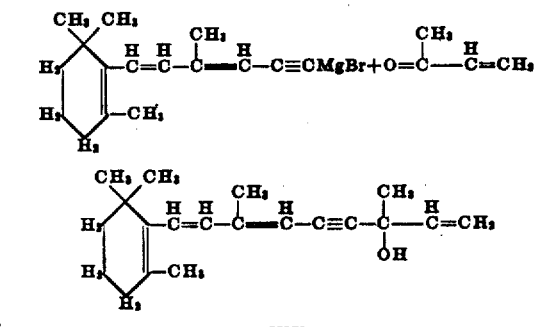

In the sixth step compound VIII is partially hydrogenated catalytically at room temperature using gaseous hydrogen and palladium black catalyst deposited on calcium carbonate or barium sulfate yielding compound IX, Equation K. Another useful method for the partial reduction of compound VIII to produce compound IX is the use of an active iron catalyst, made by leaching with alkali the aluminum from an aluminum-iron alloy, and hydrogen under a pressure of about 50–75 atmospheres and temperatures not higher than 100° C. (see Equation K).

*Equation K*

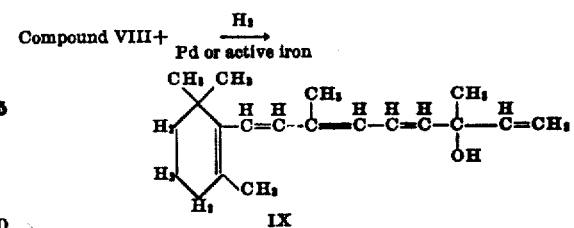

In the seventh step, compound IX may be treated with acetic anhydride to form the acetic ester of vitamin A, compound XI, Equation L.

*Equation L*

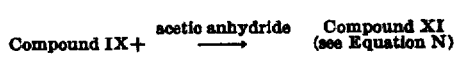

Better yields of the acetate are obtained when compound IX is treated first with phosphorus tribromide in pyridine yielding compound X, Equation M, which latter is treated with potassium acetate yielding compound XI, Equation N.

*Equation M*

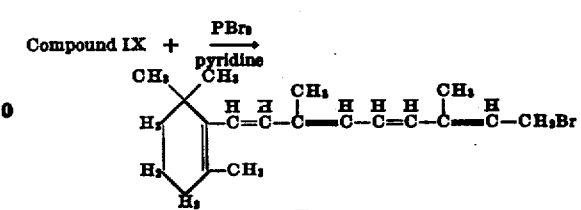

Equation N

Compound X + potassium acetate →(heat)

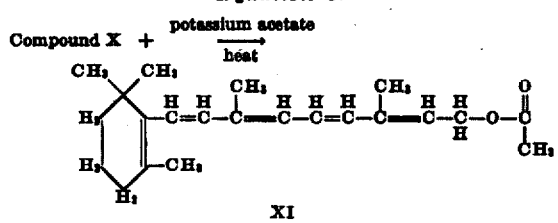

XI

The vitamin is finally prepared by saponifying compound XI, Equation O, or by treating compound X with silver hydroxide (see Equation P).

Equation O

Compound XI →(saponify, alcoholic KOH, 60–70° C. in N atmosphere) Compound I

Equation P

Compound X →(AgOH, in alcoholic solution up to 50° C.) Compound I

In the preparation of compound XI, the following alternative route may be used: Methyl vinyl ketone is condensed with sodium or lithium acetylide in liquid ammonia to produce compound XII, Equation Q, which latter is then converted into the Grignard XIII, Equation R, by interaction with ethyl magnesium bromide. The Grignard XIII is allowed to react in ether solution with the aldehyde IV followed by hydrolysis with tartaric acid or ammonium sulfate to produce compound XIV, Equation S.

Equation Q

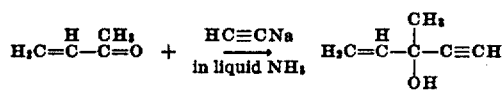

XII

Equation R

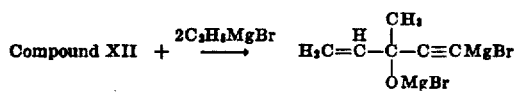

XIII

Equation S

Compound IV + Compound XIII →(followed by hydrolysis with tartaric acid or $(NH_4)_2SO_4$)

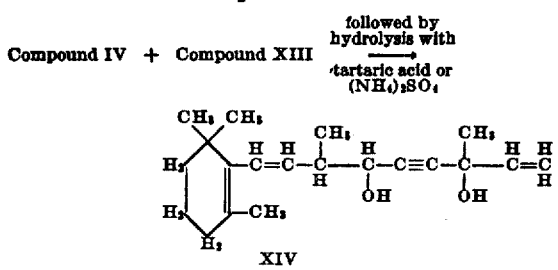

XIV

Compound XIV is then partially reduced to compound XV using the catalysts and conditions described above (see Equation T).

Equation T

Compound XIV + $H_2$ →(Pd on $CaCO_3$ or $BaSO_4$)

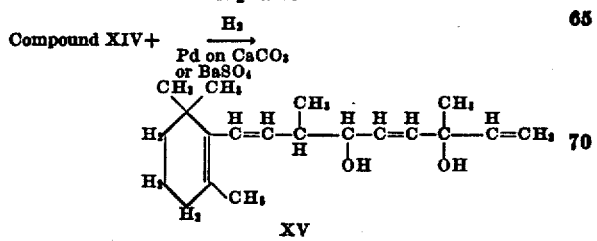

XV

An alternative method used to prepare compound XIV consists in the interaction of the Grignard of V with methyl vinyl ketone (see Equation U).

Equation U

Grignard of V

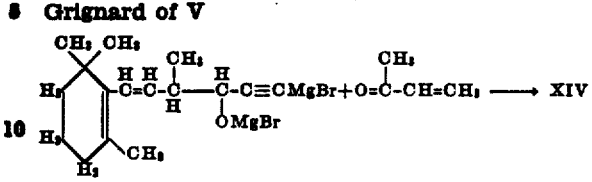

Compound XV is brominated with phosphorus tribromide in pyridine at 0° C. yielding compound XVI, Equation W, and the latter is treated with exactly one mol of potassium hydroxide in alcohol to yield compound X, Equation Y. This treatment yields the bromide, compound X, from which the vitamin can be prepared in accordance with the reactions O and P above.

Equation W

XV + $\tfrac{3}{4}PBr_3$ →(Pyridine at 0° C.)

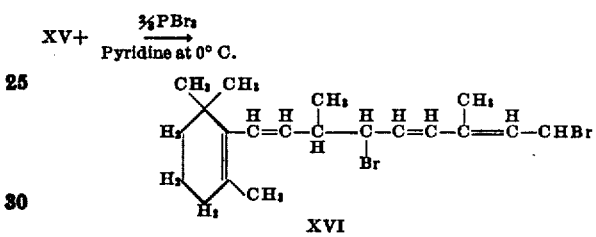

XVI

Equation Y

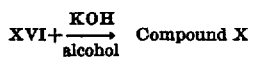

XVI + →(KOH, alcohol) Compound X

A more detailed account of the principal reactions is to be found in the following pages.

PREPARATION OF GLYCID ESTER COMPOUND II, FIRST STEP, EQUATION A

Twenty-four grams of metallic sodium is dissolved in about 300–400 cc. of absolute ethyl alcohol in a one liter filter flask fitted with a reflux condenser. It has been found preferable to add all of the sodium at once and after it has gone into solution, the alcohol is removed under reduced pressure at temperatures ranging between 160–170°. A white sodium ethylate results. This is added slowly to a vigorously stirred mixture of 192 grams of β-ionone, 122 grams ethyl chloroacetate and 110 cc. of anhydrous toluene (benzene may also be used) at 0°. After all of the sodium ethylate has been added, stirring is continued until the mixture becomes homogeneous and brownish in color, then allowed to stand at room temperature for 7–10 hours. It is then heated on the water bath for 5 hours, cooled to room temperature and acidified with 25% acetic acid. The oil separating from this mixture is fractionated under reduced pressure and the fraction boiling at 152–155° (2–3 mm.) collected. A yield of about 80% of compound II is obtained.

PREPARATION OF COMPOUNDS III AND IV, SECOND STEP, EQUATIONS B AND C

To obtain III, 107 g. of compound II is mixed with one equivalent (21.6 g.) of 10% alcoholic potash and the mixture heated on the water bath for about two hours. The alcohol is then removed under reduced pressure and the residue dissolved in the minimum amount of water and the aqueous mixture extracted a few times with ether to remove any unsaponifiable matter. The aqueous solution is then treated with 25% phosphoric acid and the oily layer which separates extracted with ether. The ether extract is then dried with anhydrous magnesium sulfate, filtered and the ether removed under reduced pressure. The residue (compound III) is heated in an atmosphere of nitrogen and in the presence of powdered glass to facilitate the removal of carbon dioxide and the aldehyde formed finally fractionated under reduced pressure and the fraction boiling at 143–145° (5 mm.) collected. A yield of about 85–90% of compound IV is obtained. This has an $n_D{}^{27}$ 1.5032 and forms a 2,4-dinitrophenylhydrazone; M. P. 155–157° having the correct combustion analysis.

This aldehyde (compound IV) has also been prepared by the alternative method (Equation D) described as part of the second step.

PREPARATION OF COMPOUND V, THIRD STEP, EQUATION E

To about 1 l. of liquid ammonia, in a 3-necked flask equipped with a Hershberg stirrer and a dropping funnel, was added 1 g. of hydrated ferric nitrate and 1 g. of metallic sodium and the mixture stirred for 1 hour while the temperature was kept at −55° to −70°. To this mixture was then added a trifle excess over half a mol of metallic sodium and the mixture stirred for half an hour longer. Dry acetylene was then passed through the mixture for several hours or until most of the blue color had assumed a gray-white color. To this mixture was then added, in the course of three hours, 46 g. of compound IV in 200 cc. of anhydrous ether taking care that the temperature of the mixture never rises above −60° and that the stirring is very rapid. After all of the aldehyde has been added, the mixture is stirred for 24 hours longer, keeping the temperature between −55° and −70°. The ammonia is then allowed to evaporate and the brownish residue treated with excess cold aqueous solution of d-tartaric acid and the resulting mixture extracted with ether from which the acetylene carbinol, compound V, is isolated either by distillation under high vacuum ($10^{-3}$ mm.) or by preparing its acid phthalate ester in anhydrous pyridine and subsequently saponifying this ester to obtain the pure acetylene carbinol. The phthalic acid ester had the correct analysis and semi-microhydrogenation revealed the presence of 4 double bonds. The acetylene carbinol also gives a heavy whitish-gray precipitate with ammoniacal alcoholic silver nitrate solution characteristic for acetylenes.

Compound V has also been prepared, in anhydrous ether solution, by the interaction of compound IV with the mono-Grignard of acetylene ($HC{\equiv}CMgBr$), (Equation F).

PREPARATION OF COMPOUNDS VI AND VII, FOURTH STEP EQUATIONS H AND I

Five g. of compound V is dissolved in about 15 g. of anhydrous pyridine and the mixture cooled between 0° and −5° C. To this mixture is slowly added about 2.2 g. of phosphorus tribromide taking care that the temperature does not rise above 0°. After half an hour of standing at 0°, the mixture is warmed to about 60–70° for 15 minutes, then, without separating compound VI, the mixture is treated with the calculated amount plus 10% excess of 10% alcoholic potash. The mixture is heated on the water bath for half an hour, then poured in four times its volume of water. The aqueous mixture is then extracted several times with ether and the ethereal solution shaken a number of times with a solution of d-tartaric acid to remove the pyridine. Finally, the ether solution is dried over anhydrous magnesium sulfate, filtered, and the ether removed. The residue is nearly pure compound VII, although for further purification one can distill it under a very high vacuum.

Compound VII may also be prepared by distilling compound V under reduced pressure ($10^{-2}$–$10^{-3}$ mm.) in the presence of small amounts, 1 to 5%, of p-toluene sulfonic acid or naphthalene sulfonic acid (Equation G).

PREPARATION OF COMPOUND VIII, FIFTH STEP EQUATION J

Five g. of compound VII in 30 cc. of anhydrous ether is slowly added to an ethereal solution of the calculated amount of ethyl magnesium bromide and the mixture refluxed in an atmosphere of nitrogen for 5 to 10 hours. To this mixture is then slowly added at 0° with stirring about 2 g. of methyl vinyl ketone which is freshly distilled from small amounts of hydroquinone. The mixture is allowed to stand at room temperature overnight then poured on to a mixture of ice and ammonium sulfate. After the Grignard mixture is completely hydrolyzed, the ethereal layer is separated and dried over anhydrous magnesium sulfate, filtered, and the ether removed under reduced pressure. The residue which is nearly pure compound VIII may now be used for the next step.

PREPARATION OF COMPOUND IX, SIXTH STEP EQUATION K

Compound VIII is dissolved in absolute alcohol and to the solution added about one-twentieth of the weight of compound VIII of 1% palladium black deposited on solid powdered carbonate made in accordance with methods described in the literature. Barium sulfate may be advantageously used as the support of the catalyst. The calculated amount of hydrogen to saturate one of the bonds of the triple bond is then allowed to be absorbed by the system. The mixture is then filtered and the filtrate distilled under moderately reduced pressure. The residue is nearly pure compound IX.

The reduction of compound VIII to compound IX may also be accomplished under 50–75 atmospheres of hydrogen at not higher than 100° C. and in the presence of an active iron catalyst prepared by leaching the aluminum from an iron-aluminum alloy (Equation K).

PREPARATION OF COMPOUND XI, SEVENTH STEP EQUATIONS M AND N

Although compound XI may be prepared by the treatment of compound IX with acetic anhydride (Equation L), better yields are obtained by dissolving compound IX in anhydrous pyridine, cooling to 0°, and adding the calculated amount of phosphorus tribromide, Equation M, taking care that the temperature does not rise above 0°. The mixture is then warmed to room temperature and kept there for two hours. The mixture is then dissolved in ether and the etheral solution extracted with a cold 25% solution of acetic acid to remove the pyridine and the phosphorous acid. After the ethereal solution is dried over anhydrous magnesium sulfate, and filtered, the ether is removed under reduced pressure and the residue compound X, Equation M, is dissolved in glacial acetic acid and treated, in an atmosphere of nitrogen, with freshly fused potassium acetate, Equation N. The mixture is gently heated for about 2 hours to not higher than 100° C., then poured in cold water and extracted with ether. The ethereal solution is separated, dried, and the ether removed. The residue contains considerable amount of compound XI from which vitamin A can be easily prepared by saponifying it in the usual manner with alcoholic potash (Equation O). However, XI may be used directly as a vitamin A substitute.

I claim:

1. Process of producing a compound of the formula

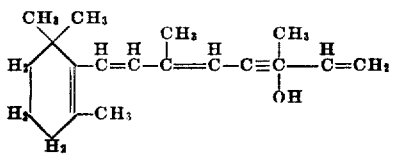

which comprises forming the Grignard of a compound of the formula

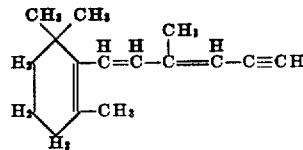

and reacting the same with methyl vinyl ketone.

2. As a new product a compound of the formula

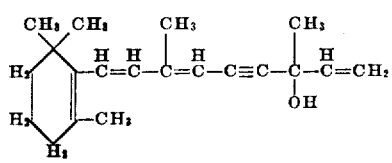

NICHOLAS A. MILAS.

Certificate of Correction

Patent No. 2,369,156.    February 13, 1945.

NICHOLAS A. MILAS

It is hereby certified that error appears in the printed specification of the above numbered patent requiring correction as follows: Page 5, first column, line 14, claim 1, for that portion of the formula reading

and that the said Letters Patent should be read with this correction therein that the same may conform to the record of the case in the Patent Office.

Signed and sealed this 26th day of June A. D. 1945.

[SEAL]

LESLIE FRAZER,
*Acting Commissioner of Patents.* cold water and extracted with ether. The ethereal solution is separated, dried, and the ether removed. The residue contains considerable amount of compound XI from which vitamin A can be easily prepared by saponifying it in the usual manner with alcoholic potash (Equation O). However, XI may be used directly as a vitamin A substitute.

I claim:
1. Process of producing a compound of the formula

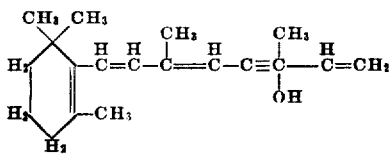

which comprises forming the Grignard of a compound of the formula

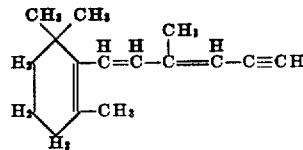

and reacting the same with methyl vinyl ketone.

2. As a new product a compound of the formula

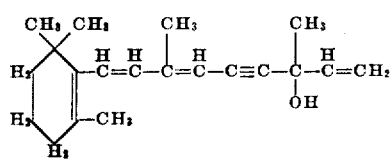

NICHOLAS A. MILAS.

Certificate of Correction

Patent No. 2,369,156.    February 13, 1945.

NICHOLAS A. MILAS

It is hereby certified that error appears in the printed specification of the above numbered patent requiring correction as follows: Page 5, first column, line 14, claim 1, for that portion of the formula reading

and that the said Letters Patent should be read with this correction therein that the same may conform to the record of the case in the Patent Office.

Signed and sealed this 26th day of June A. D. 1945.

[SEAL]

LESLIE FRAZER,
*Acting Commissioner of Patents.*